United States Patent
Besore et al.

(10) Patent No.: US 8,234,018 B2
(45) Date of Patent: Jul. 31, 2012

(54) ENERGY MANAGEMENT OF APPLIANCE CYCLE LONGER THAN LOW RATE PERIOD

(75) Inventors: John K. Besore, Prospect, KY (US); Timothy Worthington, Crestwood, KY (US); Michael F. Finch, Louisville, KY (US); Jeff Donald Drake, Louisville, KY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 12/969,723

(22) Filed: Dec. 16, 2010

(65) Prior Publication Data

US 2012/0095606 A1    Apr. 19, 2012

(51) Int. Cl.
*G05D 3/12* (2006.01)
*G05D 5/00* (2006.01)
*G05D 9/00* (2006.01)
*G05D 11/00* (2006.01)
*G05D 17/00* (2006.01)
*G08B 23/00* (2006.01)
*G06Q 10/00* (2012.01)
*G06Q 30/00* (2012.01)

(52) U.S. Cl. ........ 700/296; 700/291; 700/295; 700/297; 340/693.3; 705/7.31

(58) Field of Classification Search .................. 700/291, 700/295–297; 702/58–59; 340/693.3; 705/7.31
See application file for complete search history.

(56) References Cited

U.S. PATENT DOCUMENTS

| | | | |
|---|---|---|---|
| 4,247,786 A | 1/1981 | Hedges | |
| 5,761,083 A * | 6/1998 | Brown et al. | 700/296 |
| 6,817,195 B2 | 11/2004 | Rafalovich et al. | |
| 7,010,363 B2 * | 3/2006 | Donnelly et al. | 700/19 |
| 7,110,832 B2 * | 9/2006 | Ghent | 700/16 |
| 7,266,962 B2 | 9/2007 | Montuoro et al. | |
| 7,528,503 B2 * | 5/2009 | Rognli et al. | 307/62 |
| 8,027,752 B2 * | 9/2011 | Castaldo et al. | 700/296 |
| 2003/0178894 A1 * | 9/2003 | Ghent | 307/140 |
| 2003/0233201 A1 | 12/2003 | Horst et al. | |
| 2006/0095164 A1 * | 5/2006 | Donnelly et al. | 700/295 |
| 2007/0220907 A1 | 9/2007 | Ehlers | |
| 2008/0106147 A1 * | 5/2008 | Caggiano et al. | 307/39 |
| 2008/0272934 A1 * | 11/2008 | Wang et al. | 340/870.11 |
| 2010/0101254 A1 | 4/2010 | Besore et al. | |
| 2010/0175719 A1 * | 7/2010 | Finch et al. | 134/18 |
| 2010/0262313 A1 * | 10/2010 | Chambers et al. | 700/295 |
| 2011/0040785 A1 * | 2/2011 | Steenberg et al. | 707/769 |
| 2011/0264291 A1 * | 10/2011 | Le Roux et al. | 700/291 |

* cited by examiner

*Primary Examiner* — Ramesh Patel
(74) *Attorney, Agent, or Firm* — Global Patent Operation

(57) ABSTRACT

An energy management system for an appliance comprising an interface to receive a schedule having an off-peak time segment and an on-peak time segment; a control to determine an operation to be performed by the appliance; a mode selecting device to select between an energy management mode and an immediate start mode; and a controller connected to the interface, the control, and the mode selecting device. The controller is arranged such that upon selection of the energy management mode, the controller initiates the operation when a majority of the energy consumption of the operation is within the off-peak time segment; and upon selection of the immediate start mode, the controller initiates the operation immediately.

16 Claims, 3 Drawing Sheets

ENERGY MANAGEMENT OF APPLIANCE CYCLE LONGER THAN LOW RATE PERIOD

BACKGROUND

Many power providers are currently experiencing a shortage of electric generating capacity due to increasing consumer demand for electricity. More specifically, generating plants are often unable to meet peak power demands resulting from electricity demanded by many consumers at the same time.

In order to reduce high peak power demand, many power providers have instituted time of use metering and rates which include higher rates for energy usage during on-peak times and lower rates for energy usage during off-peak times. As a result, consumers are provided with an incentive to use electricity at off-peak times rather than on-peak times.

Presently, to take advantage of the lower cost of electricity during off-peak times, a user must manually operate appliances or other electronic devices during the off-peak times. This is undesirable because a consumer may not always be present in the home, or awake, to operate the appliance during off-peak hours. This is also undesirable because the consumer is required to manually track the current time to determine what hours are off-peak and on-peak. Therefore, there is a need to provide a system that facilitates operating appliances during off-peak hours in order to reduce consumer's electric bills and also to reduce the load on generating plants during on-peak hours. Additionally, there is a need to provide a system that (in combination with the aforementioned) incorporates practical and functional aspects of appliance operations.

SUMMARY

In one aspect of the invention, a method for managing energy usage of an appliance is provided comprising: receiving a schedule having an off-peak time segment and an on-peak time segment; storing the schedule in a memory; determining a current time; determining an operation that needs to be performed by the appliance; initiating the operation if the current time is within the off-peak time segment; determining if operation would be detrimentally affected if stopped for a duration and restarted at a later time; if the current time changes to the on-peak time segment, selectively continuing the operation if the operation is detrimentally affected by stopping and restarting, or stopping the operation if not detrimentally affected by stopping and restarting; and, restarting the stopped operation during another off-peak time segment.

In yet another aspect, the invention provides a method for managing energy usage of a plurality of appliances comprising: receiving a schedule having an off-peak time segment and an on-peak time segment; storing the schedule in a memory; determining a current time; determining a first operation of a first appliance that needs to be performed; initiating the first operation if the current time is within the off-peak time segment; determining if the first operation affects an operation of a second appliance; and, initiating the operation of the second appliance during at least a portion of the same off-peak time segment.

In yet still a further aspect, the invention provides a method for managing energy usage of an appliance comprising: receiving a schedule having an off-peak time segment and an on-peak time segment; storing the schedule in a memory; determining a current time; determining an operation that needs to be performed by the appliance; determining if the operation can be completed in the off peak time segment; initiating the operation if the current time is within the off-peak time segment and the majority of the operation can be completed within the off-peak time segment; and, wherein the majority of the operation is based on the majority of the energy consumption.

DETAILED DESCRIPTION

The present invention is an energy management system that may be used with an appliance in order to reduce household electricity costs and also to reduce the load on generating plants during peak hours of electricity usage. The energy management system is applicable to any type of appliance such as a dryer, a washing machine, a dishwasher, an oven, HVAC system, hot water heater, or a refrigerator, et al. For illustration purposes, the present invention will be described in association with a dishwasher.

Figure 1:
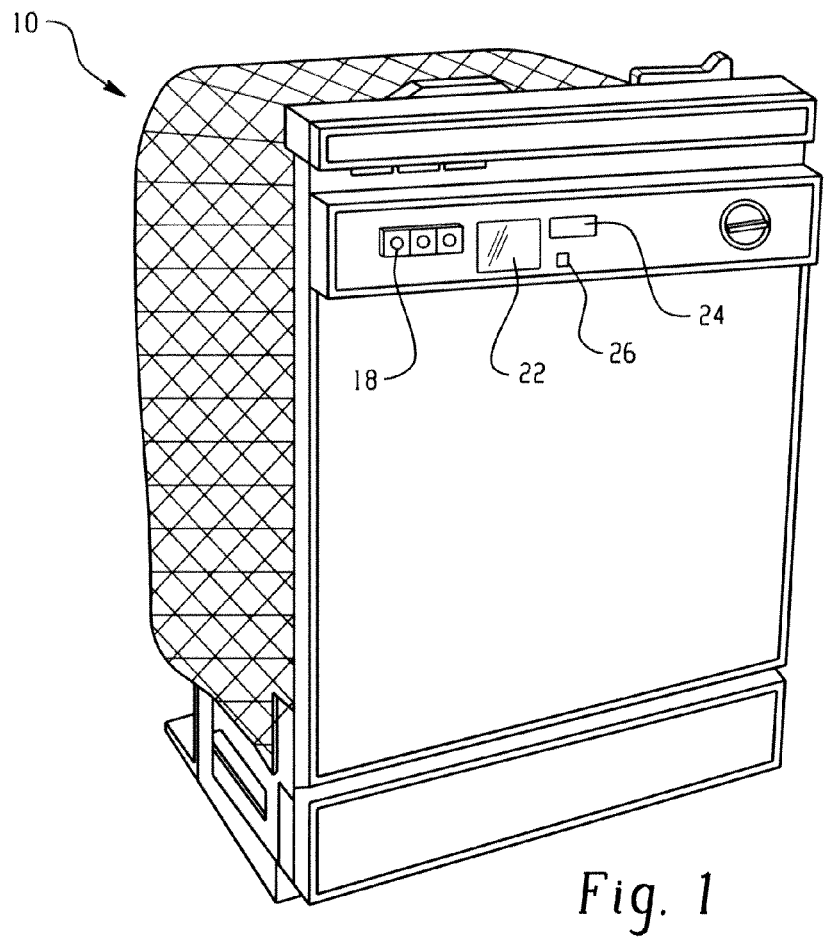
FIG. 1 is a perspective view of a dishwasher utilizing the energy management system of the present invention.

As shown in FIG. 1, the dishwasher 10 can have a loading compartment, a motor to rotate spray arms, washing and rinse cycles, an electric or gas heater (all not shown), and a control panel 18. The control panel 18 may provide control knobs or any other type of interface for selecting an operation cycle of the dishwasher. For example, the control panel 18 may be used to select between, for example, regular, heavy duty, or light wash cycles.

In one embodiment, the energy management system may include a user interface 22, a time keeping mechanism 24, and a mode selecting device 26. The user interface 22 may be any type of interface such as a touch screen, knobs, sliders, buttons, speech recognition, etc, to allow a user to input a schedule of on-peak times or schedules and off-peak times or schedules for each day of the week. The schedule of on-peak times and off-peak times for a household may typically be obtained from a generating plant or power utility that services the household. The schedule may be obtained from published tables made available to the public or other means such as billing statements. It is to be appreciated that the rate schedules can be transmitted by the utilities and received automatically by the appliance via radio signals, internet, et. al. If the schedule of times changes, the user may use the user interface to alter and update the schedule that was previously entered.

The terms on-peak and off-peak, as used herein are meant to encompass time periods that an energy supplier has designated as referring to periods of high energy demand or cost and periods of low energy demand or cost, respectively. It may be that in some situations, multiple levels are designated by the energy supplier and thus on-peak is meant to refer to those periods where the energy demand or cost is greater than some other period, with the other period being referred to as off-peak. In any given situation, on-peak may not be the highest level and off-peak may not be the lowest level.

The energy management system can also include a time keeping mechanism 24 that provides information to the appliance and user regarding the current time of the day. In one embodiment, the time keeping mechanism 24 also includes a calendar function to provide information regarding the day of the week and the current date. The current time and date may be input or adjusted by the user via controls on the time keeping mechanism.

Utility companies are starting to develop sliding rate scales based upon time of use for power consumption. An appliance, primarily a dishwasher in this case that can manage a response to a different rate schedule will have an advantage in the marketplace. A time of day (TOD) import to the dishwasher will allow the unit to run at times, on more occasions, and/or during more periods when utility rates are low or off-peak. The time of day input can be manually entered or automatically received by the dishwasher (an example of automatic updating would be using a radio wave or radio clock to sync to an atomic clock signal). The time of day feature or off-peak manager will effectively save the consumer money by running the appliance according to a predetermined schedule, i.e. predominantly, when the rates are lower.

The mode selecting device 26 allows the user to choose between an energy management mode and an immediate start mode. The mode selecting device 26 may be a single button such that the energy management mode is selected when the button is depressed and the immediate start mode is selected when the button is not depressed, or vice versa. Alternatively, the mode selecting device 26 may also be two separate buttons, a switch, a touch panel, or any other type of device that allows for selection between two modes. Although the control panel 18, the user interface 22, the time keeping mechanism 24 and the mode selecting device 24 are illustrated as four separate elements in FIG. 1, each of these elements, or any combination thereof, may alternatively be incorporated into a single interface or display to provide for ease of use.

The invention works by utilizing a series of algorithms in the dishwasher control to compare the time of day to a known (i.e. inputted via user interface) utility rate schedule. The algorithm will allow the unit to be run predominantly during lower rate time periods and minimize the duration that the unit runs during the more expensive or critical rate periods. The end result would be optional modes of operation for the dishwasher that the user could select to take advantage of lower utility costs during off peak time periods.

This invention provides a cost effective solution for appliances to counteract rising utility costs and sliding rate schedules. The invention itself can be implemented without significant hardware changes to current appliance designs. The only additional hardware that may be necessary is a radio receiver if the time of day updates were to occur automatically. The cost effective nature of the invention allows the dishwasher features to be available at lower price points than previously could be obtained. The self contained nature of the invention is an advantage since no additional wiring or kits/modules would be required to provide the end user benefits around a sliding rate schedule. It is to be appreciated that the rate schedules can be transmitted by the utilities and received automatically by the appliance via radio, internet, et. al.

Figure 2:
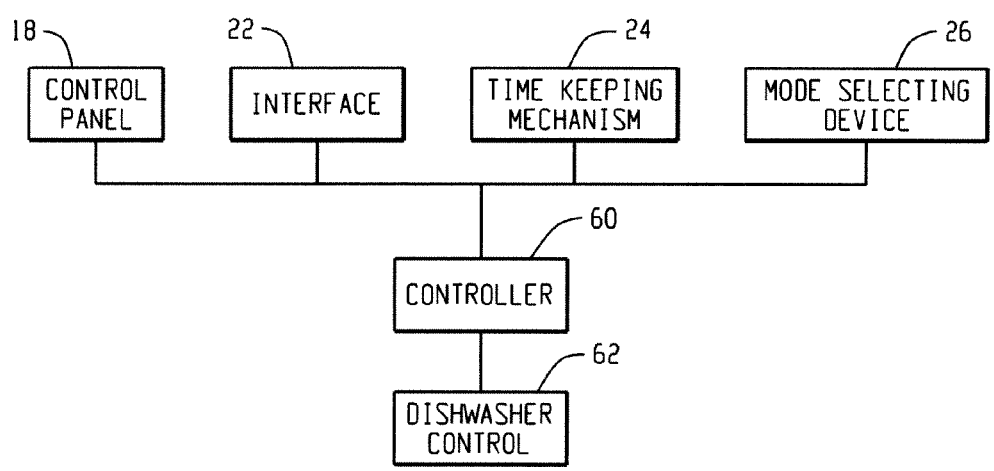
FIG. 2 is a block diagram of an appliance incorporating the energy management system; and, FIG. 3 is a flow chart or initiating and performing the energy management system of the present invention.

As illustrated in FIG. 2, the energy management system further includes a controller 60 connected to the control panel 18 and the mode selecting device 26 in order to receive signals regarding the operation selected by the user via the control panel and the mode selected by the user via the mode selecting device. The controller 60 is also connected to the user interface 22 and the time keeping mechanism 24, and preferably includes a memory for storing the schedule of on-peak and off-peak times input via the user interface, as well as the current time and date. In one embodiment, the controller has a circuit, software, and/or firmware (hereafter collectively referred to as "firmware") to determine a time to initiate the selected operation based on the selected mode. The controller 60 is further connected to a dishwasher control 62 that controls the drum, the motor, the electric or gas heater, and the dishwasher cycles pursuant to signals sent from the controller to the dishwasher control.

If the energy management mode is selected by the user, the energy management system, and specifically the controller, will signal the dishwasher control to initiate a washing cycle selected by the user at the next period of time wherein a majority of the cycle's energy consumption can occur within an off-peak time period. This scheduled period may include a period that begins in an on-peak time period or an off-peak time period, and ends in an on-peak time period or an off-peak time period. As a result, a majority of the selected washing cycle's energy consumption can be performed during an off-peak time when the rates for electricity are cheaper and the load on the generating plant that provides power for the household is at a lower level. Alternatively, if the user selects the immediate start mode, the energy management system is disabled and the washing cycle is initiated immediately as in a conventional dishwasher.

As an alternative embodiment, if the energy management system is used with a dishwasher and the consumer elects to start the dishwasher cycle at a time during off-peak hours, the controller would selectively continue the selected cycle, dependent upon the type of cycle that the appliance is running, even if the rate changes to on-peak hours during the cycle. This would enable an appliance to continue its cycle where it is difficult and/or counterproductive to stop and restart a cycle. Examples include a washing cycle that has already added water to the detergent wherein cleaning enzymes have been activated and it thus would degrade the wash cycle to stop and restart at a later time period. It is to be appreciated that the effectiveness of the detergent would be compromised if a wash cycle was started, stopped, and then delayed for an extended period of time. The controller can compare any cycle start time and duration and enable initiation of the cycle if the cycle period runs more during an off-peak period relative to an on-peak period, or if the cycle operation would be compromised by stopping and restarting at a later time. In this manner the controller balances load shedding with practical performance functionality of the respective appliance operations.

It should be understood that if the energy management system is used with a washing machine, the controller may be connected to a washer control to actuate components of the washing machine, including a motor and various valves, to initiate a selected washing cycle according to the selected mode. Similarly, when used with a dryer, the controller may be connected to a dryer control to initiate a selected drying cycle, and in an oven, the controller may be connected to an oven control to initiate a selected self cleaning cycle, et. al.

Figure 3A:
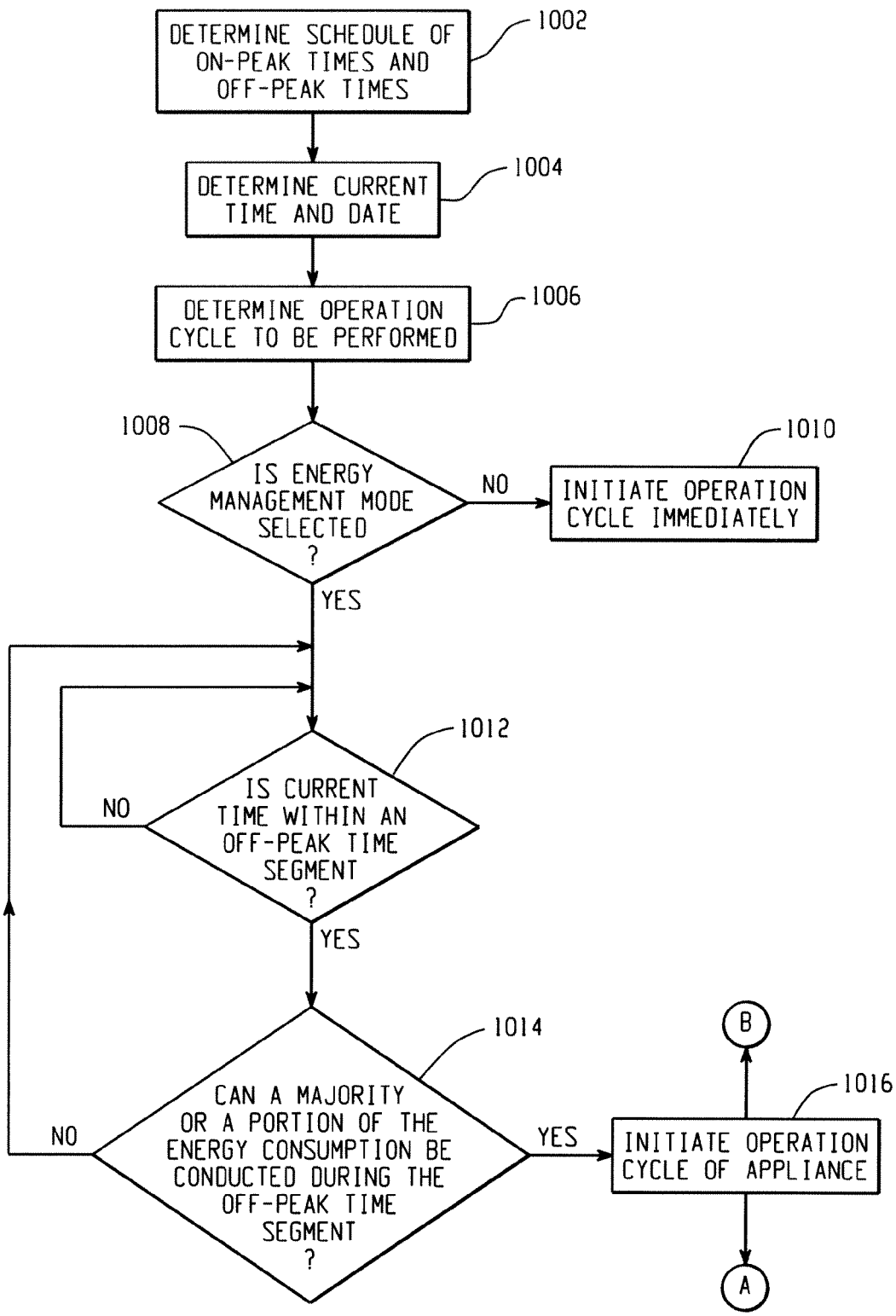
Figure 3B:
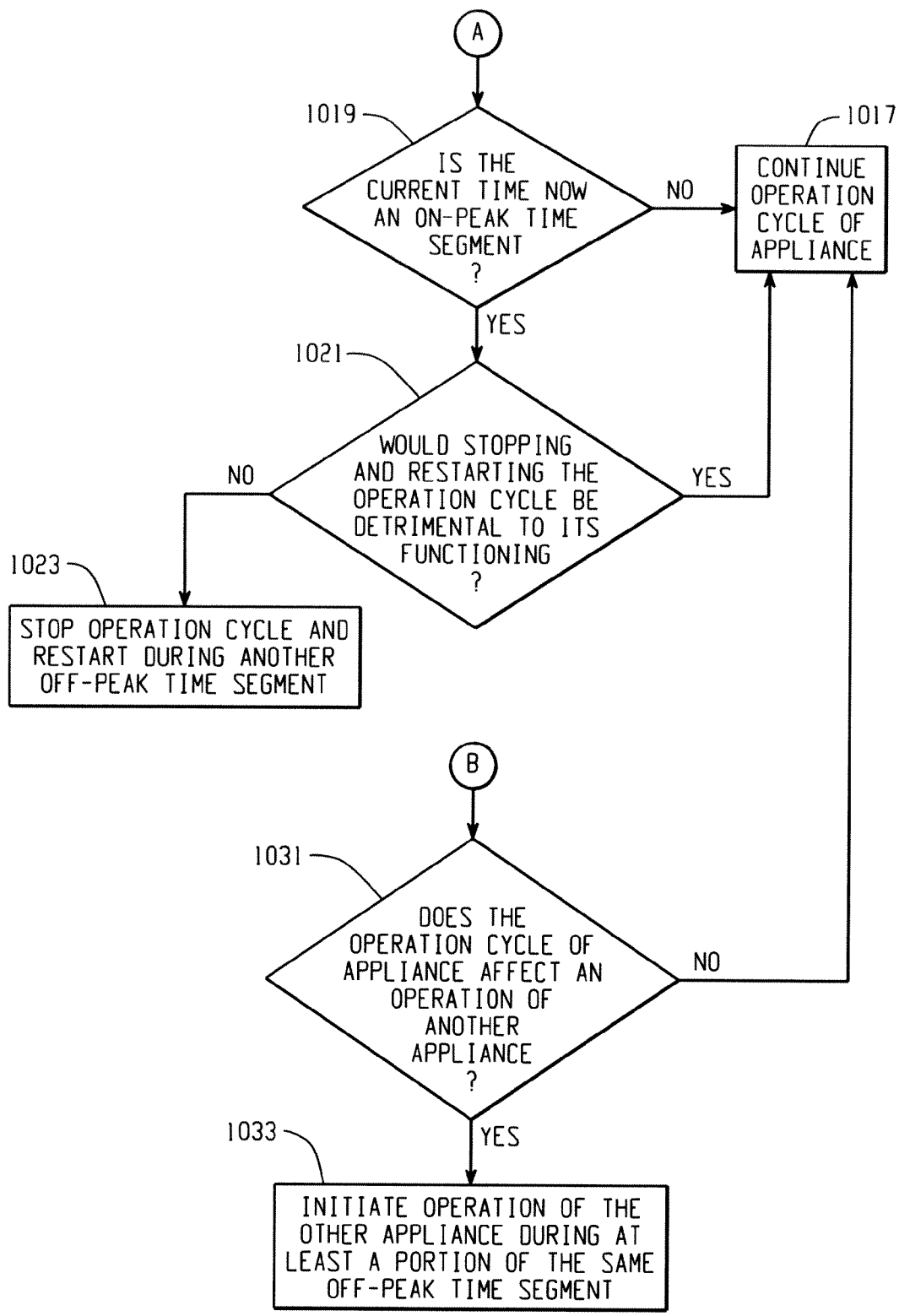

FIG. 3 illustrates a method for initiating and performing the energy management system. In Step 1002, the schedule of on-peak times and off-peak times for each day of the week is determined and preferably stored in the memory in the controller. Step 1004 then determines the current time and date. As discussed above, both the schedule and the current time may be input manually via a user interface in the appliance. In Step 1006, the user then selects an operation cycle to be performed by the appliance via the control panel, and in Step 1008, the user selects between the energy management mode and the immediate start mode via the mode selecting device. If the user selects the immediate start mode, the process proceeds to Step 1010 and the operation cycle is initiated immediately. If energy management mode is chosen (step 1008), the user can select a deadline in which the operation needs to be completed. The controller can access the schedule of on-peak times and off-peak times and checks when the operation can be performed prior to the deadline and when the operation can be performed such that all operation's cycle is conducted during an off-peak time period. If there is no off-peak time period comprising enough time to complete the entire operation's cycle, a period will be searched that comprises an off-peak time period to complete the majority of the energy consumption of the operation's cycle. If a majority of time is not available, then any portion of an off-peak time period will be chosen (step 1014). Although not illustrated, if there is not any off-peak time period from the current time to the established deadline, then the operation will be started immediately in order to complete the operation as soon as possible, albeit without any energy cost savings. In addition, the controller will assess the current, and future, cycle(s) to be performed and continue the operation's cycle(s) 1017 during an on-peak time period 1019 if discontinuing (and restarting) any of the present and future cycles would be detrimental to the performance of the cycle (step 1021). If stopping and restarting the operation's cycle is not detrimental to its functioning then the opera ion cycle can be stopped and restarted during another off-peak time segment (step 1023).

In the aforementioned manner, it is to be appreciated that the appliance operation will either be done immediately by request or by default with or without energy cost savings, or completed prior to a deadline with or without energy cost savings (step 1012). If, in Step 1012, the controller determines that there is any period of time within an off-peak time segment, the process may proceed to optional Step 1014. The controller will attempt to maximize the operation of the appliance to include as much energy consumption, albeit not necessarily a majority of time duration of a cycle's operation, during off-peak time segments as possible up to the deadline. If optional Step 1014 is not utilized, the process will proceed to Step 1016 to initiate the operation cycle.

Additionally, it should be noted that the operation cycle to be performed need not be selected manually by a user. The appliance may also include a control to detect an operation that is automatically requested by the appliance. As an example, a control in a refrigerator may include a sensor to detect when the ice reservoir requires replenishment. Accordingly, the sensor would send a signal to the controller requesting that the ice maker be actuated to provide more ice. If the energy management mode is selected on the refrigerator, the ice making operation cycle will attempt to run during an off-peak time segment. Preferably all of the cycle will be run during an off-peak time segment. If that is not possible, then a majority of the energy consumption of the cycle will be attempted to be run, and then alternatively at least a portion thereof.

In another embodiment, the user interface may also allow the user to input a deadline by which the operation cycle must be completed. In one approach, the energy management system may simply initiate the operation cycle if there is no periods of time between the current time and the deadline for which there is an off-peak period.

Alternatively, the controller may be adapted to prospectively analyze the schedule of on-peak and off-peak times between the time at which the operation cycle was requested and the deadline. By doing so, the energy management system may maximize the portion of the operation cycle that is performed during off-peak hours. As in the above example, at 9:00 AM a user may select a drying cycle that requires 1 hour to complete, with a deadline for completing the task by 3:00 PM. In this approach, the controller analyzes the schedule between 9:00 AM and 3:00 PM to determine if there is an off-peak time segment that allows for the entire operation cycle to be completed entirely within the off-peak time segment. If such an off-peak time segment exists, the operation will be conducted at the beginning of this off-peak time segment. If there is no off-peak time segment long enough to complete the entire operation cycle, the controller will determine the longest off-peak time segment that will accommodate the period of heaviest energy consumption (i.e. the majority of energy consumption) in which to complete as much of the operation cycle's total energy consumption within an off-peak time segment.

In another embodiment, a method is provided for managing energy usage of a plurality of appliances. The method can comprise receiving a schedule having an off-peak time segment and an on-peak time segment. The method can store the schedule in a memory; determine a current time; determine a first operation of a first appliance that needs to be performed; and, initiate the first operation if the current time is within the off-peak time segment. The method further determines if the first operation affects an operation of a second appliance (step 1031); and, can initiate the operation of the second appliance during at least a portion of the same off-peak time segment (step 1033). It is to be appreciated that the operation of the second appliance can include heating of water, i.e. for the wash and/or rinse cycles of a clothes washer or dishwasher. The operation of the second appliance can also include cooling of the household air, i.e. running the air conditioner in response to elevated ambient air temperature from the running of a clothes dryer or dishwasher (for example). The operation of the second appliance is dependent upon the operations of the first appliance and attempts to counter the effects of the first appliance and to consume energy during the off-peak time segment. In one arrangement, selecting the first operation can include a control panel on the appliance to select the first operation and selecting the operation of the second appliance can be initiated from the first appliance. It is to be further appreciated that the first appliance can be selected from the group consisting of a washing machine, a dishwasher, a clothes dryer, and an oven, and that the second appliance can be selected from the group consisting of a hot water heater and an air conditioner.

While various embodiments of the application have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A method for managing energy usage of an appliance comprising:
   receiving a schedule having an off-peak time segment and an on-peak time segment;
   storing the schedule in a memory, determining a current time;
   determining an operation and associated cycles that need to be performed by the appliance;
   initiating the operation if the current time is within the off-peak time segment;
   determining if operation would be detrimentally affected if stopped for a duration and restarted at a later time;
   if the current time changes to the on-peak time segment, selectively continuing the operation if a present or a future cycle of the operation is detrimentally affected by stopping and restarting the present cycle or initiating the future cycle, or stopping the operation if the present cycle or the future cycle is not detrimentally affected by stopping and restarting; and, restarting the stopped operation during another off-peak time segment.

2. The method of claim 1 further comprising:
establishing a deadline for completing the operation; and,
initiating the operation such that it is completed prior to the deadline.

3. The method of claim 1 wherein the step of receiving a schedule includes inputting the schedule via a user interface on the appliance.

4. The method of claim 3 wherein the step of storing the schedule includes storing the schedule in a memory located in the appliance.

5. The method of claim 1 wherein the step of determining an operation includes selecting an operation via a control panel on the appliance.

6. A method for managing energy usage of a plurality of appliances comprising:
receiving a schedule having an off-peak time segment and an on-peak time segment;
storing the schedule in a memory,
determining a current time;
determining a first operation of a first appliance that needs to be performed;
initiating the first operation if the current time is within the off-peak time segment;
determining if the first operation affects an operation of a second appliance; and,
initiating the operation of the second appliance during at least a portion of the same off-peak time segment.

7. The method of claim 6 wherein the operation of the second appliance includes heating of water.

8. The method of claim 7, wherein selecting the operation of the second appliance is initiated from the first appliance.

9. The method of claim 6 wherein the operation of the second appliance includes cooling of air.

10. The method of claim 9, wherein selecting the operation of the second appliance is initiated from the first appliance.

11. The method of claim 10, further comprising a time keeping mechanism for providing the current time wherein the time keeping mechanism is automatically updated.

12. The method of claim 11, wherein the first appliance is selected from the group consisting of a washing machine, a dishwasher, a clothes dryer, and an oven, and the second appliance is selected from the group consisting of a hot water heater and an air conditioner.

13. The method of claim 6, wherein selecting the first operation includes a control panel on the appliance to select the first operation.

14. The method of claim 13, wherein selecting the operation of the second appliance is initiated from the first appliance.

15. The method of claim 6, wherein the first appliance is selected from the group consisting of a washing machine, a dishwasher, a clothes dryer, and an oven, and the second appliance is selected from the group consisting of a hot water heater and an air conditioner.

16. A method for managing energy usage of an appliance comprising:
receiving a schedule having an off-peak time segment and an on-peak time segment;
storing the schedule in a memory;
determining a current time;
determining an operation that needs to be performed by the appliance;
determining if the operation can be completed in the off peak time segment;
initiating the operation if the current time is within the off-peak time segment and the majority of the operation can be completed within the off-peak time segment; and,
wherein the majority of the operation is based on the majority of the energy consumption;
determining if operation would be detrimentally affected if stopped for a duration and restarted at a later time;
if the current time chances to the on-peak time segment selectively continuing the operation if the operation is detrimentally affected by stopping and restarting, or stopping the operation if not detrimentally affected by stopping and restarting; and,
restarting the stopped operation during another off-peak time segment.

* * * * *

UNITED STATES PATENT AND TRADEMARK OFFICE
CERTIFICATE OF CORRECTION

| | | |
|---|---|---|
| PATENT NO. | : 8,234,018 B2 | Page 1 of 1 |
| APPLICATION NO. | : 12/969723 | |
| DATED | : July 31, 2012 | |
| INVENTOR(S) | : John K. Besore et al. | |

It is certified that error appears in the above-identified patent and that said Letters Patent is hereby corrected as shown below:

In Column 1, Lines 39-40, delete "deter mining" and insert -- determining --, therefor.

In Column 2, Line 13, delete "or" and insert -- for --, therefor.

In Column 2, Line 50, delete "et. al." and insert -- et al. --, therefor.

In Column 3, Line 29, delete "device 24" and insert -- device 26 --, therefor.

In Column 3, Line 55, delete "et. al." and insert -- et al. --, therefor.

In Column 4, Line 52, delete "et. al." and insert -- et al. --, therefor.

In Column 5, Line 22, delete "opera ion" and insert -- operation --, therefor.

In Column 6, Line 53, in Claim 1, delete "memory," and insert -- memory; --, therefor.

In Column 7, Line 21, in Claim 6, delete "memory," and insert -- memory; --, therefor.

In Column 8, Line 29, in Claim 16, delete "segment; and," and insert -- segment; --, therefor.

In Column 8, Line 34, in Claim 16, delete "chances" and insert -- changes --, therefor.

In Column 8, Line 34, in Claim 16, delete "segment" and insert -- segment, --, therefor.

Signed and Sealed this
Twenty-third Day of October, 2012

David J. Kappos
*Director of the United States Patent and Trademark Office*